(12) United States Patent
Lakshmipathi

(10) Patent No.: US 7,725,085 B2
(45) Date of Patent: May 25, 2010

(54) SPACE-TIME COMMUNICATIONS DETERMINATION

(75) Inventor: Sondur Lakshmipathi, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 954 days.

(21) Appl. No.: 11/382,418

(22) Filed: May 9, 2006

(65) Prior Publication Data

US 2007/0026819 A1 Feb. 1, 2007

(30) Foreign Application Priority Data

May 10, 2005 (IN) .................. 1187/DEL/2005

(51) Int. Cl.
*H03C 7/02* (2006.01)
*H04B 1/04* (2006.01)

(52) U.S. Cl. .................. 455/101; 455/129; 455/132

(58) Field of Classification Search ............. 455/101, 455/129, 279.1, 566, 73, 130, 132, 133; 370/334, 370/338, 310, 329
See application file for complete search history.

(56) References Cited

U.S. PATENT DOCUMENTS

| 7,039,412 | B2 * | 5/2006 | Sandhu et al. | 455/445 |
| 7,233,773 | B2 * | 6/2007 | Hansen et al. | 455/69 |
| 7,423,989 | B2 * | 9/2008 | Hansen et al. | 370/328 |
| 2005/0185575 | A1 * | 8/2005 | Hansen et al. | 370/208 |

* cited by examiner

*Primary Examiner*—Sonny Trinh
(74) *Attorney, Agent, or Firm*—Schwegman, Lundberg & Woessner, P.A.

(57) ABSTRACT

Apparatus and systems, a well as methods and articles, may operate to determine whether to communicate using a space-time communications technique responsive to an indication derived from processing a short time sequence.

17 Claims, 3 Drawing Sheets

SPACE-TIME COMMUNICATIONS DETERMINATION

This application claims the benefit of priority to Indian Patent Application No. 1187/DEL/2005, filed on May 10, 2005, which is incorporated herein by reference in its entirety.

TECHNICAL FIELD

Various embodiments described herein relate to communications generally, including apparatus, systems, and methods used to transmit and receive information, such as space-time communications systems.

BACKGROUND INFORMATION

Space-time communication techniques, including the use of multiple-input, multiple-output (MIMO) systems, can make it possible to multiply the data rate of a wireless local area network (WLAN) by nearly as many times as the number of antennas employed, without the need for increased spectrum usage. However, evaluating the suitability of space-time communication techniques for use in a particular environment may involve significant signaling overhead.

DETAILED DESCRIPTION

Various embodiments disclosed herein may operate to determine whether space-time communications should be employed (or continue to be employed) by processing a short time sequence (STS), perhaps embedded in one or more packets transmitted from a plurality of antennas by a client station (STA) to an access point (AP). The packets may be formatted according to an IEEE (Institute of Electrical and Electronic Engineers) 802.11 standard, such as an IEEE 802.11b, 802.11h, or 802.11n standard. For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11; 1999" and related amendments/versions.

Figure 1:
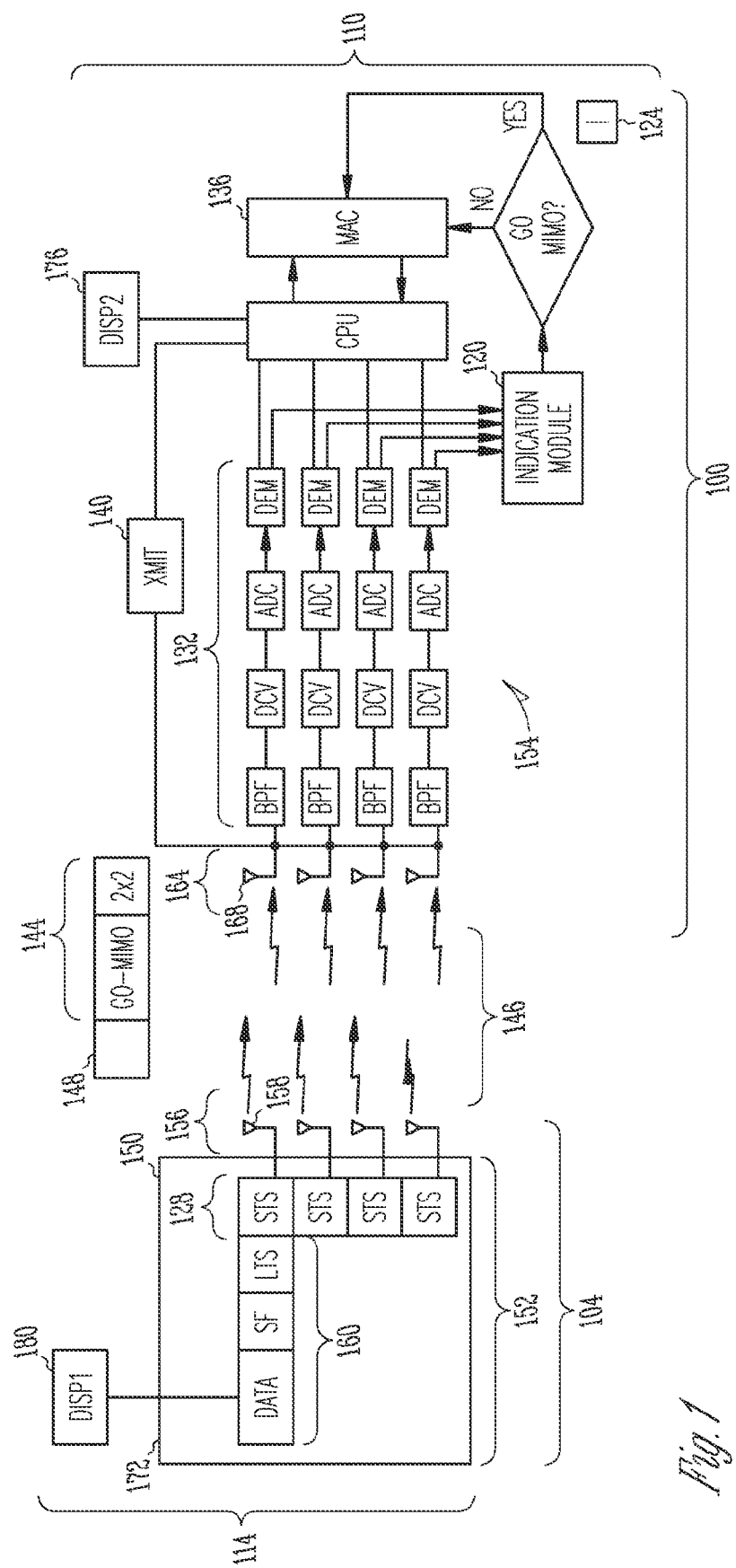
FIG. 1 is a block diagram of apparatus and systems according to various embodiments of the invention.

FIG. 1 is a block diagram of apparatus 100, 104 and systems 110, 114 according to various embodiments of the invention, each of which may operate as previously described. Thus, the apparatus 100 may include an indication module 120 to provide an indication 124 (e.g., GO MIMO, NO-GO MIMO, etc.) of whether to communicate (or continue communicating) using a space-time communications technique in response to processing an STS 128.

For example, a method of processing the STS can be implemented by assuming that l=1, . . . , 12 represents twelve non-zero subcarriers in an STS, and that k snapshots (making up a group of samples) can be obtained for each subcarrier frequency $f_l$. Each snapshot may include four samples corresponding to four antennas, perhaps forming a portion of a multiple-input, multiple-output (MIMO) system. This, a matrix $X^l$ of size 4×k may then be constructed with respect to the four antennas.

The correlation matrix for subcarrier l may be designated as: $C^l = E[X^l X^{H^l}]$, with a QR decomposition computed as $C^l = Q^l R^l$, where $Q^l$ is designated as an orthogonal matrix for the $l^{th}$ subcarrier, and $R^l$ is designated as an upper triangular matrix for the $l^{th}$ subcarrier. Here E may comprise the averaging operator, and $X^{H^l}$ may comprise the conjugate transpose of $X^l$. Since $X^l$ may comprise a column vector and $X^{H^l}$ may comprise a row vector, multiplication of the two vectors $X^l X^{H^l}$ can provide a matrix realization for one snapshot. Averaging over several snapshots may then provide the correlation matrix $C^l$.

At this point, the diagonal elements of $R^l$ may be extracted as $r^l = \text{diag}(R^l) = [r^l_{11}\ r^l_{22}\ \ldots\ r^l_{44}]$. Averaging $r^l$ over all 12 subcarriers may be accomplished according to the formula:

$$r = \frac{1}{12} \sum_{l=1}^{12} r^l = [r_{11}\ r_{22}\ \ldots\ r_{44}].$$

The determination of whether to communicate using space-time communications may now be made. For example, if $r_{11} \ll r_{nn}$, for n=2, 3, 4 (e.g., $r_{11}$ is more than about two times larger than $r_{nn}$) then the channel should not be used to support space-time communications (e.g., MIMO communications) since it is likely that only a single dominant loss of signal path exists for both the STA and AP. The indication, which may form the state of a reserved bit in a packet, may thus comprise "NO-GO MIMO" in this case. Of course, other boundaries may be established with respect to the amount $r_{11}$ is greater than $r_{44}$. For example, $r_n$ may be more than about five times, or even ten times greater than $r_{nn}$ before the decision is made that space-time communications should not be supported by the channel.

If $r_{11} \approx r_{22}$ (e.g., $r_{11}$ is approximately equal to $r_{22}$) and $R_{11} \ll r_{33}$ and $r_{11} \ll r_{44}$ then the channel may be used to support space-time communications (e.g., 2×2 MIMO), since it is likely that two independent dominant paths (e.g., multipaths) are present. If $r_{11} \approx r_{22} \approx r_{33}$ (e.g., $r_{11}$ is approximately equal to $r_{22}$ and $r_{33}$) and $r_{11} \ll r_{44}$ then the channel may be used to support space-time communications (e.g., 3×3 MIMO), since it is likely that three dominant independent paths (e.g., multipaths) are present. If $r_{11} \approx r_{22} \approx r_{33} \approx r_{44}$ (e.g., $r_{11}$ is approximately equal to $r_{22}$, $r_{33}$, and $r_{44}$), then the channel may be used to support space-time communications (e.g., 4×4 MIMO), since it is likely four or more dominant independent paths (e.g., multipaths) are present. In these cases, the indication (e.g., the state of a reserved bit in a packet) may comprise "GO MIMO". In some embodiments, a determination of whether to implement space-time communications can be made through a QR decomposition of STS samples obtained from the antennas involved. Fast-QR decomposition, and Gram-Schmidt orthogonalization, as well as other techniques known to those of skill in the art may be used for finding $[r_{11}\ r_{22} \ldots r_{44}]$.

Assuming space-time communications are to be supported (e.g., the indication comprises GO MIMO), the AP may respond with a packet, including a clear to send (CTS) packet indicating the GO MIMO status, along with the diversity order, if desired. The STA may then respond, in turn, with a MIMO transmission according to the diversity order indicated in the packet transmitted by the AP. However, if space-time communications are not to be supported, the AP may respond with a packet, including a clear to send (CTS) packet, indication the NO-GO MIMO status.

In GO MIMO situation, perhaps indicated using a CTS packet, the STA may respond with a MIMO transmission (e.g., 4×4 MIMO) where the data packet format, including the STS and long term sequences (LTSs) are compatible with legacy IEEE 802.11a and 802.11g formats. The training pattern of the packet transmission may occur using any number of suitable methods, such as frequency orthogonality, time orthogonality, repetition, or a cyclic delay diversity method.

Many configurations of the apparatus 100 are possible. For example, in some embodiments, the apparatus 100 may include a plurality of reception chains 132 to couple to the indication module 120 and to receive the STS 128. The reception chains 132 may include a number of component elements, such as a bandpass filter BPF, and RF down-converter DCV, an analog-to-digital conversion device ADC, and a demodulator DEM (e.g., an orthogonal frequency-division multiplexing (OFDM) demodulator) to provide the STS 128 to the indication module 120. The apparatus 100 may also include a media access control (MAC) module 136 to receive the indication 124.

In some embodiments, the apparatus 100 may include a transmitter 140 to transmit information 144 in response to the indication 124, which may be included in a packet 148, such as a clear to send (CTS) packet. The transmitter 140 may comprise a number of components, such as a modulator, digital to analog converter, up-converter, and bandpass filter. The transmitter may have a number of baseband-RF paths connected to antennas 164, similar to the four baseband-RF paths (reception chains 132) shown in FIG. 1. The packet 148 may be formatted according to an IEEE 802.11 standard. The information 144 may include any number of components. For example, the information 144 may comprise an indication selected from GO MIMO and NO-GO MIMO, corresponding to an indication that a channel with support space-time communications, or an indication that a channel should not be used to support space-time communication, respectively.

Many embodiments may be realized. For example, consider a WLAN 146 including an AP 154 capable of communicating according to IEEE 801.11 standard, such as an IEEE 802.11n standard. Assuming the presence of mixed client stations, including STA 150 that can communicate according to a variety of IEEE 802.11 standards (e.g., IEEE 802.11b, 802.11g, and 802.11n standard), various embodiments may include formatting a packet 152, such as an RTS (request to send) packet, to be transmitted by the STA 150 so as to be understood by the AP 154 and legacy STAs (not shown). Some embodiments include processing and STS 128 included in the packet 152 by the AP 154 to estimate the channel suitability for engaging in (e.g., beginning, continuing, and/or resuming) space-time communications, such as MIMO communications.

In another example, a STA 150 may operate to seize a WLAN 146 channel by sending a packet 152, such as an RTS packet, to an AP 154. The packet 152 format may conform to a variety of legacy modem formats, such as an IEEE 802.11 standard format. An STS 128 within the packet 152 may be transmitted by a plurality of antennas 156 (e.g., the four antennas 156 shown in FIG. 1). An LTS and control date 160 may be transmitted by a single antenna 158 with the same format as a legacy STA format (e.g., an IEEE 802.11 format). Other STAs (not shown) listening to the STA 150 may implement a backoff function to facilitate the exchange of packets between the AP 154 and the STA 150 after receiving the packet 148, such as an RTS packet, and the NAV (Network Allocation Vector) may by set accordingly.

The AP 154 may receive the packet 152, including the STS 128 using a plurality of antennas 164 (e.g., for antennas shown in FIG. 1) as well as receiving the LTS and control data using a single antenna 168. The AP 154 may operate to process the packet 152, including the STS 128, to estimate the feasibility of channel support for continued space-time communications, perhaps providing an indication (e.g., GO MIMO or NO-GO MIMO) 124 as a result. The AP 154 may then respond by transmitting a packet 148, such as a CTS packet, including the information 144, such as an indication of GO MIMO or NO-GO MIMO.

Other embodiments may be realized. For example, the apparatus 104 may include a transmission module 172 to transmit an STS 128 and the remainder of an associated packet 152 using a single antenna 158 selected from a plurality of antennas 156. The STS 128 may also be substantially simultaneously transmitted without the remainder of the associated packet 152 using the remainder of the plurality of antennas 156 (e.g., some of the antennas 156, not including antenna 158). The associated packet 152 may comprise an RTS packet formatted according to an IEEE 802.11 standard. The transmission module 172 may be included in an access point, a hand-held computer, a laptop computer, a personal digital assistant, a cellular telephone, a STA, and an AP, among others.

Other embodiments may be realized. For example, a system 110 may include one or more apparatus 100, as described above, as well as a plurality of antennas 164 and a display 176 to display information derived from packets 152 received by a plurality of reception chains 132 (coupled to the plurality of antennas 164). As noted previously, the some of the reception chains 132 may include one or more demodulators DEM to provide an STS 128 (included in the packet 142) to the indication module 120 for processing. The display 176 may comprise a cathode ray tube display, as well as a solid-state display (e.g., liquid crystal), and may be included in a hand-held computer, a laptop computer, a person digital assistant, a cellular telephone, a STA, and an AP, among others.

Other embodiments may be realized. For example, a system 114 may include one or more apparatus 104, as described above, as well as a plurality of antennas 156 and a display 180 to display information derived from packets 148 received by the plurality of antennas 156. The display 180, as well as the transmission module 712, may be included in a hand-held computer, a laptop computer, a personal digital assistant, a cellular telephone, a STA, and an AP, among others. The display 180 may comprise a cathode ray tube display, as well as a solid-state display (e.g., liquid crystal).

The apparatus 100, 104; systems 110, 114; indication module 120; indication 124; STS 128; reception chains 132; bandpass filter BPF; RF down-converter DVC; analog-to-digital conversion device ADC; demodulator DEM; MAC module 136; transmitter 140; information 144; packets 148, 152; STA 150; AP 154; WLAN 146; antennas 156, 158, 164, 168; transmission module 172; and displays 176, 180 may all be characterized as "modules" herein. Such modules may include hardware circuitry, single and/or multi-processor circuits, memory circuits, software program modules and objects, and/or firmware, and combinations thereof, as desired by the architect of the apparatus 100, 104 and systems 110, 114, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in application other than MIMO communication systems, and thus, various embodiments are not to be so limited. The illustrations of apparatus 100, 104 and systems 110, 114 are intended to provide a general understanding of the structure of various embodiments, and they are not intended to serve as a complete description of all the elements and features of apparatus and systems that might make use of the structures described herein.

Applications that may include the novel apparatus and systems of various embodiment include electronic circuitry used in high-speed computers, communication and signal processing circuitry, modems, single and/or multi-processor modules, single and/or multiple embedded processors, data switches, and application-specific modules, including multi-layer, multi-chip modules. Such apparatus and systems may further be included as sub-components within a variety of electronic systems, such as televisions, cellular telephones, personal computers, workstations, radios, video players, vehicles, and others.

Figure 2:
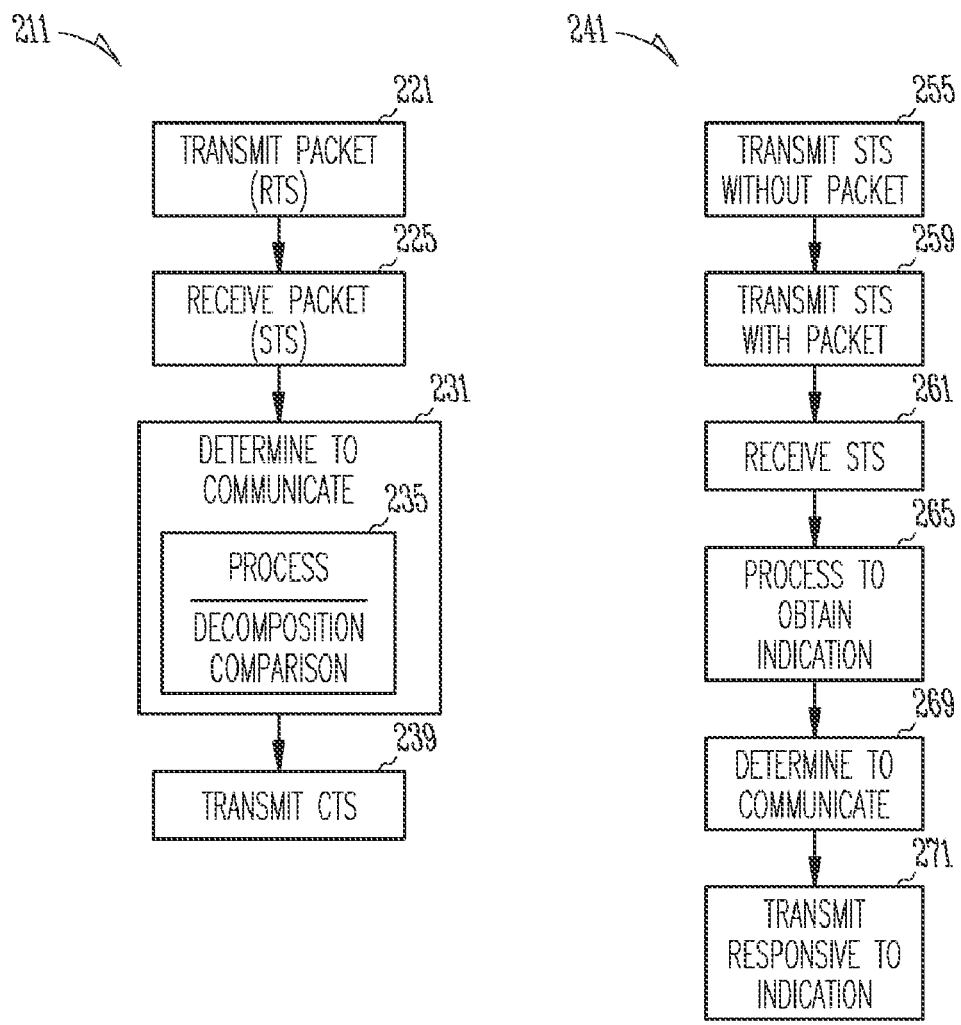
FIG. 2 is a flow diagram illustrating several methods according to various embodiments of the invention.

Some embodiments may include a number of methods. For example, FIG. 2 is a flow diagram illustrating several methods 211 according to various embodiments of the invention. A method 211 may begin at block 221 with transmitting a packet, such as an RTS packet, from a STA, for example. A first antenna included in a plurality of antennas may be used to transmit the packet, including an STS and the remainder of the packet. Other antennas in the plurality of antennas (e.g., not including the first antenna) may be used to transmit the STS, without the remainder of the packet, at substantially the same time. Thus, the method 211 may include transmitting an RTS packet including an STS, as well as transmitting just the STS at substantially the same time, at block 221.

The method 211 may include receiving the packet at block 225, including the STS, and then determining whether to communicate using a space-time communications technique at block 231, perhaps in response to an indication derived from processing the STS. Thus, the method 211 may include receiving the STS as a portion of an RTS packet at block 225, as well as receiving the STS without the remainder of the packet at substantially the same time.

The method 211 may include processing the STS to derive the indication at block 235. Processing the STS may include determining the indication using a decomposition of a correlation matrix, as described previously, wherein the correlation matrix (e.g., $C^l = E[X^l X^{H^l}]$) includes samples of 1 non-zero subcarriers included in the STS. Thus, the method 211 may include comparing a first averaged value of a first element (e.g., $r^l_{11}$ selected from a triangular matrix $R^l$) to a second averaged value of a second element (e.g., $r^l_{22}$ selected from the triangular matrix $R^l$), wherein the triangular matrix forms a portion of the decomposition.

The method 211 may include transmitting a packet, such as a CTS packet, including information responsive to the indication so derived, at block 239. The packet may be transmitted from an AP, for example. The information may be selected from one of GO MIMO and NO-GO MIMO, as described above.

Other embodiments may be realized. For example, a method 241 may include transmitting an STS without the remainder of an associated packet using some of a plurality of antennas at block 255. The method 241 may include substantially simultaneously transmitting the STS and the remainder of the associated packet using a single antenna selected from the plurality of antennas at block 259 (e.g., the single antenna may be a different antenna from those used to send the STS at block 255). The associated packet may be formatted according to an IEEE 802.11 standard, and may be transmitted as an RTS packet.

In some embodiment, the method 241 may include receiving the STS as a portion of an RTS packet transmitted along with a remainder of the RTS packet using a single antenna selected from a plurality of antennas at block 261.

The method 241 may also include deriving an indication as to whether space-time communications should be continued by processing the STS included in the received packet, such as an RTS packet, at block 265. Processing the STS may include any of the activities described above with respect to block 235. Thus, the method 241 may include determining whether to communicate using a space-time communications technique in response to the indication derived from processing the STS at block 269.

The method 241 may also include transmitting a packet including information indicating whether to use one of a non-MIMO transmission and a MIMO transmission in response to the indication derived from processing the STS at block 271. The packet may be transmitted using a non-MIMO transmission, a MIMO transmission, or both (responsive to the indication derived from processing the STS). Transmitting the packet at block 271 may include transmitting a CTS packet including information responsive to the indication, wherein the information is selected from one of GO MIMO and NO-GO MIMO.

It should be noted that the methods described herein do not have to be executed in the order described, or in any particular order. Moreover, various activities described with respect to the methods identified herein can be executed in repetitive, simultaneous, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Figure 3:
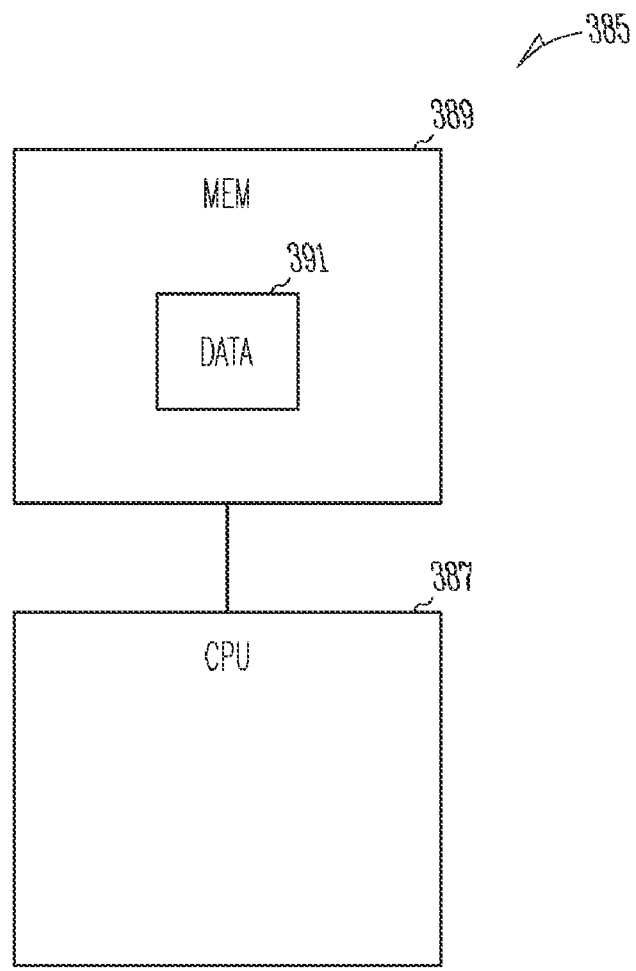
FIG. 3 is a block diagram of an article according to various embodiments of the invention.

Thus, other embodiments may be realized. For example, FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include one or more processors 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the processor(s) 387) performing such actions as determining whether to communicate using a space-time communications technique responsive to an indication derived from processing an STS. Other activities may include receiving the STS as a portion of an RTS packet transmitted along with a remainder of the RTS packet using a single antenna selected from a plurality of antennas, as well as transmitting a CTS packet including information in response to the indication, wherein the information is selected from one of GO MIMO and NO-GO MIMO, for example.

In some embodiments, the article 385 may include one or more processors 387 coupled to a machine-accessible medium 389 having associated information 391, which, when accessed, results in a machine performing such actions as transmitting an STS and a remainder of an associated packet using a single antenna selected from a plurality of antennas, and substantially simultaneously transmitting the STS without the remainder of the associated packet using a remainder of the plurality of antennas. Other activities may include transmitting the associated packet as a packet formatted according to an IEEE 802.11 standard and/or as an RTS packet.

Implementing the apparatus, systems, and methods disclosed herein may aid in determining whether space-time communication techniques should continue to be utilized, perhaps without incurring significant signaling overhead. Increased system response time and reduced power consumption may result, since both the AP and STA may acquire knowledge as to whether such communications should be used (including the diversity order) by virtue of a legacy-compatible RTS/CTS packet exchange.

Although the inventive concept may be discussed in the exemplary context of an 802.xx implementation (e.g., 802.11a, 802.11g, 802.11HT, 802.16, etc.), the claims are not so limited. Indeed, embodiments of the present invention may well be implemented as part of any wired and/or wireless system. Examples may also include embodiments comprising multi-carrier wireless communication channel (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments id defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept it more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   an indication module to provide an indication of whether to communicate using a space-time communications technique in response to processing a short time sequence; and
   a plurality of reception chains to couple to the indication module and to receive the short time sequence as a portion of a request to send packet transmitted along with a remainder of the request to send packet using a single antenna selected from a plurality of antennas.

2. The apparatus of claim 1, wherein selected ones of the reception chains include:
   a demodulator to provide the short time sequence to the indication module.

3. The apparatus of claim 1, further including:
   a media access control module to receive the indication.

4. The apparatus of claim 1, further including:
   a transmitter to transmit information in response to the indication, wherein the information is included in a clear to send packet.

5. The apparatus of claim 4, wherein the clear to send packet is formatted according to an Institute of Electrical and Electronic Engineers (IEEE) 802.11 standard.

6. The apparatus of claim 4, wherein the information is selected from one of GO multiple-input, multiple-output and NO-GO multiple-input, multiple-output.

7. A system, including:
   an indication module to provide an indication of whether to communicate using a space-time communications technique in response to processing a short time sequence;
   a plurality of reception chains to couple to the indication module and to receive the short time sequence as a portion of a request to send packet transmitted along with a remainder of the request to send packet using a single antenna selected from a plurality of antennas; and
   a solid state display to display information derived from packets received by the plurality of reception chains.

8. The system of claim 7, wherein selected ones of the reception chains include:
   a demodulator to provide the short time sequence to the indication module.

9. The system of claim 7, wherein the display is included in one of a hand-held computer, a laptop computer, a personal digital assistant, and a cellular telephone.

10. A method, including:
    receiving a short time sequence as a portion of a request to send packet transmitted along with a remainder of the request to send packet using a single antenna selected from a plurality of antennas; and determining whether to communicate using a space-time communications technique in response to an indication derived from processing the short time sequence.

11. The method of claim 10, further including:

transmitting a clear to send packet including information in response to the indication.

12. The method of claim 11, wherein the information is selected from one of GO multiple-input, multiple-output and NO-GO multiple-input, multiple-output.

13. The method of claim 10, further including:

deriving the indication by processing the short time sequence included in a received request to send packet.

14. The method of claim 10, further including:

decomposing a correlation matrix to determine the indication.

15. The method of claim 14, further including:

comparing a first averaged value of a first element selected from a triangular matrix to a second averaged value of a second element selected from the triangular matrix, wherein the triangular matrix forms a portion of the decomposition.

16. An article including a machine-accessible medium having associated information, wherein the information, when accessed, results in a machine performing:

receiving a short time sequence as a portion of a request to send packet transmitted along with a remainder of the request to send packet using a single antenna selected from a plurality of antennas; and determining whether to communicate using a space-time communications technique in response to an indication derived from processing the short time sequence.

17. The article of claim 16, wherein the information, when accessed, results in a machine performing:

transmitting a clear to send packet including information responsive to the indication, wherein the information is selected from one of GO multiple-input, multiple-output and NO-GO multiple-input, multiple-output.

* * * * *

UNITED STATES PATENT AND TRADEMARK OFFICE
CERTIFICATE OF CORRECTION

PATENT NO. : 7,725,085 B2 Page 1 of 1
APPLICATION NO. : 11/382418
DATED : May 25, 2010
INVENTOR(S) : Sondur Lakshmipathi It is certified that error appears in the above-identified patent and that said Letters Patent is hereby corrected as shown below:

On the Title page, item (57), under "Abstract", in column 1, line 1, delete "a" and insert -- as --, therefor.

Signed and Sealed this

Thirteenth Day of July, 2010

David J. Kappos
*Director of the United States Patent and Trademark Office*